United States Patent
Nair et al.

(10) Patent No.: US 10,552,005 B2
(45) Date of Patent: Feb. 4, 2020

(54) POINTS LIST TOOL FOR A BUILDING MANAGEMENT SYSTEM

(71) Applicant: Honeywell International Inc., Morris Plains, NJ (US)

(72) Inventors: Ajay N. Nair, Bangalore (IN); Marco Nostrini, Milan (IT)

(73) Assignee: Honeywell International Inc., Morris Plains, NJ (US)

(*) Notice: Subject to any disclaimer, the term of this patent is extended or adjusted under 35 U.S.C. 154(b) by 73 days.

(21) Appl. No.: 15/979,345

(22) Filed: May 14, 2018

(65) Prior Publication Data
US 2019/0346976 A1    Nov. 14, 2019

(51) Int. Cl.
G06F 3/0482    (2013.01)
H04L 12/24     (2006.01)
G06F 3/0484    (2013.01)
G05B 15/02     (2006.01)

(52) U.S. Cl.
CPC ........... *G06F 3/0482* (2013.01); *G05B 15/02* (2013.01); *G06F 3/04847* (2013.01); *H04L 41/22* (2013.01)

(58) Field of Classification Search
CPC ... G06Q 50/01; G06F 3/0482; G06F 3/04847; G06F 17/30; G06F 8/34; G06F 3/04812; G05B 15/02; G05B 19/41; H04L 41/22; H04L 12/28
See application file for complete search history.

(56) References Cited

U.S. PATENT DOCUMENTS

| | | | |
|---|---|---|---|
| 5,980,096 A * | 11/1999 | Thalhammer-Reyero | G05B 17/02 |
| 6,556,950 B1 * | 4/2003 | Schwenke | G05B 17/02 700/83 |
| 6,618,856 B2 * | 9/2003 | Coburn | G05B 19/41885 700/86 |
| 6,993,456 B2 * | 1/2006 | Brooks | G05B 19/409 702/183 |
| 8,850,346 B2 | 9/2014 | Keenan, Jr. et al. | |
| 9,488,969 B2 | 11/2016 | Brady et al. | |
| 9,798,336 B2 | 10/2017 | Przybylski | |
| 2002/0054101 A1 * | 5/2002 | Beatty | G06Q 10/06 715/764 |
| 2006/0058900 A1 | 3/2006 | Johanson et al. | |
| 2006/0058923 A1 | 3/2006 | Kruk et al. | |

(Continued)

OTHER PUBLICATIONS

EC-Net: AX-3.7 Platform Guide, Distech Controls, 157 pages, 2012.

(Continued)

*Primary Examiner* — Steven P Sax
(74) *Attorney, Agent, or Firm* — Seager Tufte & Wickhem LLP

(57) ABSTRACT

A building energy management system for controlling one or more building control units having points is disclosed. The building energy management system may be configured to display a schematic representation of a building control unit that is bounded to points in accordance with binding information. In response to receiving a point list request, the building energy management system may extract and generate a points list in a list format that includes some or all of the points in the schematic representation of the building control unit. Generating favorite points links, filtering points and batch setting point values are also contemplated.

13 Claims, 13 Drawing Sheets

(56) References Cited

U.S. PATENT DOCUMENTS

| | | | |
|---|---|---|---|
| 2006/0265664 A1* | 11/2006 | Simons | A62B 99/00 715/772 |
| 2008/0060009 A1* | 3/2008 | Kelts | G06F 3/0481 725/39 |
| 2010/0257483 A1* | 10/2010 | Velozo | G06Q 10/06 715/825 |
| 2011/0087988 A1* | 4/2011 | Ray | G06O 10/06 715/771 |
| 2014/0019148 A1* | 1/2014 | Buzz | G06Q 10/06 705/1.1 |
| 2014/0222704 A1* | 8/2014 | Abhyanker | H04W 4/21 705/319 |
| 2014/0288890 A1* | 9/2014 | Khainson | G06F 17/5004 703/1 |
| 2015/0356419 A1 | 12/2015 | Shircliff et al. | |
| 2016/0161928 A1 | 6/2016 | Bobker et al. | |
| 2017/0116560 A1* | 4/2017 | Wickstrom | G06Q 10/063114 |
| 2017/0322782 A1* | 11/2017 | Pakiman | G06F 8/34 |
| 2017/0343991 A1* | 11/2017 | Green | G05B 19/4183 |
| 2018/0121035 A1* | 5/2018 | Filippi | G06T 11/206 |
| 2018/0278434 A1* | 9/2018 | Maseng | H04L 12/2836 |

OTHER PUBLICATIONS

"FX Workbench User's Guide," Johnson Controls, 356 pages, Jan. 2017.

"Technical Document: Niagara AX-3.x User Guide," Niagara Framework, 436 pages, May 1, 2007.

"Technical Document: Niagara AX-3.6 User Guide," Niagara Framework, 434 pages, Apr. 4, 2011.

"JACE Niagara 4 Install and Startup Guide," Niagara, 54 pages, Aug. 18, 2015.

* cited by examiner

316 Full View of Point List View

Search by Point Label — 360

Default View — 318        Actions — 336

28 Points

| 320 | Label ⇔ 322 | 324 Value ⇔ | Log 326 | Status ⇔ 328 | Path ⇔ 330 |
|---|---|---|---|---|---|
| ⊘ | NumericWritable | | | | |
| 334a | AHU_2_INTAKE_AIR_TEMPERATURE | 21.63°C | 🗎 | ok | /Home/Plant/AHU2_INTE... |
| 334b | AHU_2_INTAKE_AIR_HUMIDITY | 49.39 %RH | 🗎 | ok | /Home/Plant/AHU2_INTE... |
| 334c | AHU_2_SUPPLY_AIR_TEMPERATURE | 25.53 °C | 🗎 | alarm.unackedAlarm | /Home/Plant/AHU2_INTE... |
| 334d | AHU_2_EXTRACT_AIR_TEMPERATURE | 21.50 °C | 🗎 | unackedAlarm | /Home/Plant/AHU2_INTE... |
| 334e | AHU_2_COOLING_VALVE_COMMAND | 0.00 % | 🗎 | ok | /Home/Plant/AHU2_INTE... |
| 334f | AHU_2_HEATING_VALVE_COMMAND | 0.00 % | 🗎 | ok | /Home/Plant/AHU2_INTE... |
| 334g | AHU_2_SUPPLY_1_SPEED_CONTROL | 0.00 % | 🗎 | ok | /Home/Plant/AHU2_INTE... |
| 334h | AHU_2_EXTRACT_1_SPEED_CONTROL | 0.00 % | 🗎 | ok | /Home/Plant/AHU2_INTE... |
| ⊘ | BooleanWritable | | | | |
| 334i | AHU_2_INTAKE_DAMPER_ENABLE | ◯ | | ok | /Home/Plant/AHU2_INTE... |
| 334j | AHU_2_SUPPLY_1_ENABLE | ◯ | | ok | /Home/Plant/AHU2_INTE... |
| 334k | AHU_2_EXTRACT_1_ENABLE | ◯ | | ok | /Home/Plant/AHU2_INTE... |
| 334l | AHU_2_EXHAUST_DAMPER_ENABLE | ◯ | | ok | /Home/Plant/AHU2_INTE... |

| 28 Points | Search by Point Label | | ⤺ ⬒ ⚠ | Default View | | | |
|---|---|---|---|---|---|---|---|
| | Label ⇕ | | Value ⇕ | Log | Status ⇕ | Path | |
| | NumericWritable | | | | | | |
| 334a ☑ | AHU_2_INTAKE_AIR_TEMPERATURE | | 21.63°C | 🗄 | ok | /Hom... | E... |
| 334b ☑ | AHU_2_INTAKE_AIR_HUMIDITY | | 49.39 %RH | 🗄 | ok | /Home/Plant/AHU2_INTE... | |
| 334c ☑ | AHU_2_SUPPLY_AIR_TEMPERATURE | | 25.53 °C | 🗄 | alarm.unackedAlarm | /Home/Plant/AHU2_INTE... | |
| 334d ☑ | AHU_2_EXTRACT_AIR_TEMPERATURE | | 21.50 °C | 🗄 | unackedAlarm | /Home/Plant/AHU2_INTE... | |
| 334e ☐ | AHU_2_COOLING_VALVE_COMMAND | | 0.00 % | 🗄 | ok | /Home/Plant/AHU2_INTE... | |

346 — Default View

336 — Actions:
- Set To Manual
- Set To Auto
- Save to Favourites
- Export to CSV

FIG. 4A

| Search by Point Label | | | |
|---|---|---|---|
| Label ⇔ | | Value ⇔ | Path |
| NumericWritable | | | |
| AHU_2_INTAKE_AIR_TEMPERATURE | | 25.24°C | /Hom |
| AHU_2_INTAKE_AIR_HUMIDITY | | 40.56 %RH | /Hom |
| AHU_2_SUPPLY_AIR_TEMPERATURE | | 20.36 °C | |

346

Default View
Default View — 318
Graphic Views
AHU_2_INTE... — 348
Favourites
AHU2_CRITICAL... — 350
alarm.unackedAlarm

FIG. 4C

Bulk update

| | | Search by Point Label | | | Default View | | | | Actions |
|---|---|---|---|---|---|---|---|---|---|
| 28 Points | | Label | | Value | | Log | Status | Path | Set To Manual |
| | | | | | | | | | Set To Auto |
| | | NumericWritable | | | | | | | Export to CSV |
| | | | | | | | | /Hom | Save to Favourites |
| 334a | ☑ | AHU_2_INTAKE_AIR_TEMPERATURE | | 25.24°C | | ᴅʙ | ok | /Home/Plant/AHU2_INTE... |
| 334b | ☑ | AHU_2_INTAKE_AIR_HUMIDITY | | 40.56 %RH | | ᴅʙ | ok | /Home/Plant/AHU2_INTE... |
| 334c | ☑ | AHU_2_SUPPLY_AIR_TEMPERATURE | | 20.36 °C | | ᴅʙ | alarm.unackedAlarm | /Home/Plant/AHU2_INTE... |
| 334d | ☑ | AHU_2_EXTRACT_AIR_TEMPERATURE | | 24.82 °C | | ᴅʙ | unackedAlarm | /Home/Plant/AHU2_INTE... |
| 334e | ☑ | AHU_2_COOLING_VALVE_COMMAND | | 0.00 % | | ᴅʙ | ok | /Home/Plant/AHU2_INTE... |
| 334f | ☑ | AHU_2_HEATING_VALVE_COMMAND | | 0.00 % | | ᴅʙ | ok | /Home/Plant/AHU2_INTE... |
| 334g | ☐ | AHU_2_SUPPLY_1_SPEED_CONTROL | | 0.00 % | | ᴅʙ | ok | /Home/Plant/AHU2_INTE... |

FIG. 5A

| NumericWritable | | |
|---|---|---|
| ☑ AHU_2_INTAKE_AIR_TEMPERATURE | 23.00°C | Value updated bulk |
| ☑ AHU_2_INTAKE_AIR_HUMIDITY | 23.00 %RH | |
| ☑ AHU_2_SUPPLY_AIR_TEMPERATURE | 23.00 °C | |
| ☑ AHU_2_EXTRACT_AIR_TEMPERATURE | 23.00 °C | |
| ☑ AHU_2_COOLING_VALVE_COMMAND | 23.00 % | |
| ☑ AHU_2_HEATING_VALVE_COMMAND | 23.00 % | |

FIG. 5C

POINTS LIST TOOL FOR A BUILDING MANAGEMENT SYSTEM

TECHNICAL FIELD

The disclosure relates generally to building management systems, and more particularly to building management systems for monitoring and controlling the operation of building control units.

BACKGROUND

Building management systems are used to monitor and control building control units throughout a building. A building control unit may include, for example, a Heating, Ventilation and/or Air Conditioning (HVAC) unit, a lighting unit, a security unit, a fire unit and/or other building control unit. Building management systems that are used to monitor and/or control such building control units can be quite complex and non-intuitive to operate, especially for end customers like facility managers, operators and building owners. This can make management of their building less efficient, more time consuming, and may require more assistance from the building management system contractor. What would be desirable is a simplified customer interface that hides unnecessary complexity of the basic framework of the system and provides a simplified end user interface.

SUMMARY

This disclosure relates generally to building management systems, and more particularly to building management systems for monitoring and controlling the operation of building control units. In one example, a building energy management system may control one or more building control units, where each building control unit may include a number of points. The building energy management may include a user interface that may include a display, a memory for storing binding information used in binding each of the points of the one or more building control units to the building energy management system, and a controller operatively coupled to the user interface, the memory, and the one or more building control units. The controller may be configured to display a schematic representation of at least one of the building control units on the display. The schematic representation of the at least one building control unit may include one or more points that are bound to the at least one building control unit in accordance with the binding information stored in the memory. The controller may be configured to receive via the user interface a request from a user requesting the generation of a points list for at least some of the points that are bound to the at least one building control unit displayed in the schematic representation on the display. In response to receiving the request from the user, the controller may automatically extract and generate a points list in a list format that may include at least some of the points that are bound to the displayed building control unit, and display the generated points list on the display.

Alternatively or additionally to the foregoing, the generated points list may include a plurality of columns, including a point name column and one or more of a point value column, a point status column and a point log column.

Alternatively or additionally to any of the embodiments above, the generated points list may include a plurality of columns, including a point name column and an alarm column, wherein the alarm column indicates if the corresponding point is currently under an alarm condition.

Alternatively or additionally to any of the embodiments above, the generated points list may include an alarm filter option, that when selected, removes all points from the displayed points list except those under an alarm condition.

Alternatively or additionally to any of the embodiments above, the controller may be configured to allow a user to select two or more points from the displayed points list that are under an alarm condition and batch acknowledge the alarm conditions.

Alternatively or additionally to any of the embodiments above, the controller may be configured to allow a user to select two or more points from the displayed points list and to batch set the selected two or more points to a manually input value.

Alternatively or additionally to any of the embodiments above, the controller may be configured to allow a user to select one or more points from the displayed points list and to link those selected points to a favorite set of points link, wherein when the user subsequently selects the favorite set of points link, the controller displays only those points that were linked to the favorite set of points link in a points list.

Alternatively or additionally to any of the embodiments above, the one or more building control units may include an HVAC unit.

Alternatively or additionally to any of the embodiments above, the one or more building control units may include an air handling unit (AHU).

Alternatively or additionally to any of the embodiments above, the controller may be configured to execute html code to display in a browser application program the schematic representation of at least one of the building control units and the generated points list.

Alternatively or additionally to any of the embodiments above, the request from the user requesting to generated the points list for at least some of the points that are bound to the at least one building control unit may be received via a selection of a point view menu option in a drop-down menu.

In another example of the disclosure, a building energy management system may control one or more building control units, where each building control unit may include a number of points. The building energy management system may include a user interface that may include a display, a memory for storing binding information used in binding each of the points of the one or more building control units to the building energy management system, a controller operatively coupled to the user interface, the memory, and the one or more building control units. The controller may be configured to display a points list in a list format that may include at least some of the points that are bound to one or more of the building control units and allow a user to select one or more first points from the displayed points list and to link those selected first points to a first favorite set of points link. When the user subsequently selects the first favorite set of points link, the controller is configured to display only those points that were linked to the first favorite set of points link.

Alternatively or additionally to any of the embodiments above, the user may subsequently select the first favorite set of points link from a drop-down menu.

Alternatively or additionally to any of the embodiments above, the controller may be further configured to allow a user to select one or more second points from the displayed points list and to link those selected second points to a second favorite set of points link, wherein when the user subsequently selects the second favorite set of points link, the controller may display only those points that were linked to the second favorite set of points link.

Alternatively or additionally to any of the embodiments above, the first favorite set of points link and the second favorite set of points link may be added to and selectable from a menu accessible via the user interface, wherein the user may subsequently select the first favorite set of points link or the second favorite set of points link from the menu.

Alternatively or additionally to any of the embodiments above, the one or more building control units may include an HVAC unit.

Alternatively or additionally to any of the embodiments above, the one or more building control units may include an air handling unit (AHU).

In another example of the disclosure, a building energy management system may control one or more building control units, where each building control unit may include a number of points. The building energy management system may include a user interface that may include a display, a memory for storing binding information used in binding each of the points of the one or more building control units to the building energy management system, a controller operatively coupled to the user interface, the memory, and the one or more building control units. The controller may be configured to display a points list in a list format that may include at least some of the points that are bound to one or more of the building control units, wherein the points list may include a plurality of columns, including a point name column and an alarm column, wherein the alarm column may indicate whether the corresponding point is under an alarm condition, and allow a user to select a filter via the user interface that may remove all points from the displayed points list except for those that are under an alarm condition.

Alternatively or additionally to any of the embodiments above, the controller may be configured to allow a user to select two or more points from the displayed points list that may be under an alarm condition and batch acknowledge the alarm conditions.

Alternatively or additionally to any of the embodiments above, the controller may be configured to allow a user to select one or more points from the displayed points list and may link those selected points to a favorite set of points link, wherein when the user subsequently selects the favorite set of points link, the controller may display only those points that were linked to the favorite set of points link in a points list.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIG. 3C is an illustrative points list screen that may be displayed in response to a user selecting the Point View Widget in the illustrative drop down menu shown in FIG. 3B;

FIG. 4A is another illustration of a points list screen that allows a user to make a selection of points;

FIG. 4C is another illustrative points list screen showing only the points that are associated with an AHCU2_CriticalPoints favorites link created using the screens of FIG. 4A and FIG. 4B;

FIG. 5A another illustration of the points list screen that allows a user to make a selection of points;

FIG. 5C is another illustrative points list screen showing the points selected using the screen shown in FIG. 5A set to an override value of 23 using the screen shown in FIG. 5B;

Figure 1:
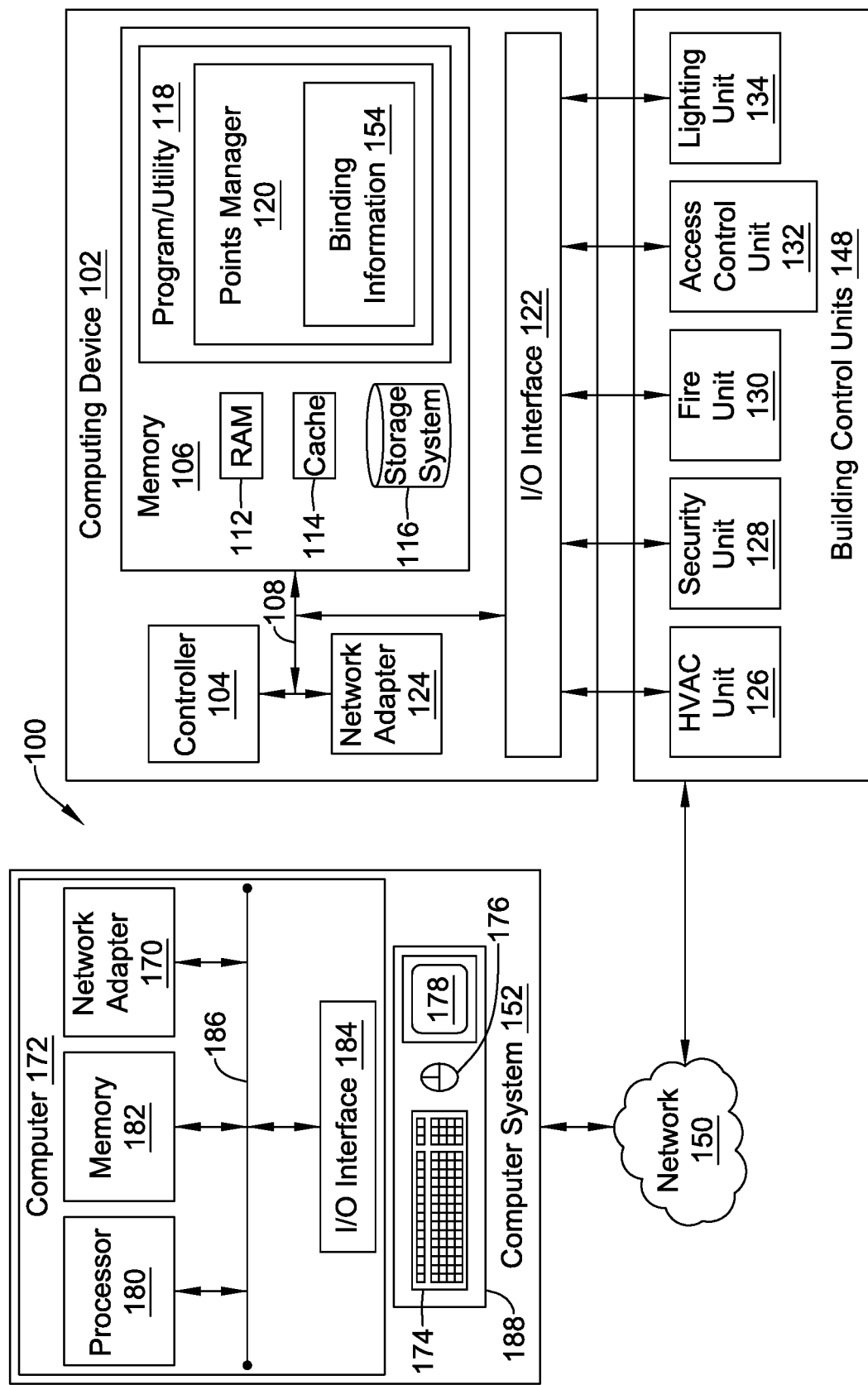
FIG. 1 is a schematic block diagram of an illustrative building management system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

Certain embodiments of the present disclosure may be found in a system, a method, and/or a non-transitory computer-readable storage medium with an executable program stored thereon for implementing and/or using a point list tool that increases the transparency of building control units and allows non-programmers to have better control of a building energy management system. In some cases, the inbuilt programming tool may include binding information for binding representing building control units as a collective set of points. In some cases, controller(s) may be configured to identify the points belonging to a building control unit and display a schematic representation of the building control unit bounded with the points according to the binding information. In this regard, a user may be provided the opportunity to identify certain bounded points and request to view those bounded points as a points list. The requested bounded points may then be extracted and a list formatted points list may be automatically generated and displayed to the user. This disclosure describes systems, methods, and executable programs that allow a building energy management system to more easily identify and represent certain aspects of building control units to create a monitoring environment that may allow increased control and potentially increase operational efficiency of the building control units.

A "point" can be considered any input or output device used to control the overall or specific performance of a building control unit or output devices related to the building control unit. Generally, "points" can be classified into one of four or more categories including an analog input, a discrete input, an analog output and a discrete output. An analog input may correspond to, for example, a sensor that monitors physical data, such as temperature, a flow, or a pressure. A discrete input may correspond to, for example, a sensor that monitors status, such as the status of a momentary and maintained switch, ON-OFF equipment status, and digital pulses from flow and/or electric power meters. An analog output may correspond to, for example, a physical action of a proportional device in the controlled equipment, such opening an air damper, valve or inlet guide vane from 20% to 40%. An discrete output may correspond to, for example, a change to a device status, such as momentary or maintains switching for start/stop of pumps, fans, two-position dampers, and on/off control. These are just examples. The building control unit may each have a different set of available points.

FIG. 1 is a schematic block diagram of an illustrative building energy management system 100. In some cases, the building energy management system 100 may include a local computing device 102, building control units 148 operatively coupled to the local computing device 102, and a remote computer system 152. As shown, the building control units 148 may include, but are not limited to, a Heating, Ventilation, and/or Air Conditioning (HVAC) unit 126, a security unit 128, a fire unit 130, an access control unit 132, and a lighting unit 134.

In some cases, the HVAC unit 126 may include one or more HVAC control devices (e.g. Air Handing Units (AHU), Variable-Air-Volume (VAV) units, dampers, valves, fans, heating units, cooling units, sensors, thermostats, humidifiers, dehumidifiers etc.), which allow for the monitoring and/or control of temperature and/or other environmental conditions in a building. The security unit 128 may include, sensors, alarm devices, audio/visual devices, lights, contact sensors for monitoring the state of doors and windows, security card pass systems, electronic locks, etc. The fire unit 130 may include smoke/heat sensors, a sprinkler system, warning lights, etc. The access control unit 132 may include doors, door locks, windows, window locks, turnstiles, parking gates, elevators, or other physical barrier, where granting access can be electronically controlled. The lighting unit 134 may include emergency lights, outlets, lighting, drapes, and general load switching, some of which are subject to "dimming" control which varies the amount of power delivered to the various building control devices. These are just a few examples of the building control units 148. In some cases, the building control units 148 may also include low voltage devices (not shown) that may include, but are not limited to, garage door openers, lawn sprinklers, exterior lights, and pool/spa heaters (controlled via a relay or the like).

As shown in FIG. 1, the local computing device 102 can function as a server, a client, a local controller, or any other suitable device. In the example shown, the local computing device 102 can perform various communication and data transfer functions as described herein and can execute one or more application functions. Computing device 102 can be any of a wide variety of computing devices, such as a server computer, a desktop computer, a handheld computer, a tablet computer, mobile telephone or other mobile device, and the like. The components of computing device 102 may include, but are not limited to, a controller 104, a system memory 106, and a bus 108 that couples various system components including system memory 106 to the controller 104. The controller 104 may include one or more controllers or processors that execute instructions stored in the system memory 106.

When provided, the bus 108 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Local computing device 102 may include a variety of computer system readable media. Such media may be any available media that is accessible by the local computing device 102, and it may include volatile memory, non-volatile memory, removable and non-removable media.

The system memory 106 of the local computing device 102 can include computer system readable media in the form of volatile memory, such as random access memory (RAM) 112 and/or cache memory 114. Computing device 102 may further include other removable/non-removable, volatile/non-volatile computer system storage media. By way of example only, storage system 116 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 108 by one or more data media interfaces. As will be further depicted and described below, the system memory 106 may include at least one program product having a set of program modules that are configured to carry out the functions of providing instructions and/or binding information to the building energy management system 100.

In some cases, program/utility 118 may be stored in the system memory 106 and may include a set of application program modules (e.g. software), such as a points manager 120. In some cases, the program/utility 118 may include additional program modules as well as an operating system, one or more other application program modules, and program data. In some cases, the application program modules (e.g., the points manager 120) may include a binding information application 154, for example. In some cases, the points manager 120, including the binding information application 154, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The points manager 120 may execute on the local computing device 102. In some cases, the points manager 120 may execute on the remote computer system 152. In some cases, part of the points manager 120 is executed on the local computing device 102 and part of the points manager 120 is executed on the remote computer system 152. In the latter scenario, the remote computer system 152 may be connected to the local computing device 102 through any type of network (e.g., network 150), including a local area network (LAN) or a wide area network (WAN), or the connection may be made to an external computer (for example, through the Internet using an Internet Service Provider).

In some cases, the local computing device 102 may communicate with one or more devices such as the building control components of the building control units 148. Such communication can occur via Input/Output (I/O) interface(s) 122. In some cases, the building control components of the building control units 148 may be managed by the local computing device 102. In some cases, the local computing device 102 may use the controller 104 to send control instructions to the building control components of the building control units 148. For instance, the controller 104 of the local computing device 102 may be operatively coupled to I/O interface(s) 122 via the bus 108, and may use the I/O interface 122 to communicate with building control components of the building control units 148.

In some cases, the I/O interface 122 may be connected to the building control components through a wired or wireless network, and in some cases the I/O interface 122 may communicate with the building control components of the building control units 148 using one or more different communication protocols. For example, in some cases, the I/O interface 122 may communicate with the HVAC unit 126 through serial and/or parallel communication using building automation protocols over a BACnet. In some cases, the I/O interface 122 may communicate with the security unit 128 through serial and/or parallel communication using building automation protocols over a DC-09 network. In some cases, the I/O interface 122 may communicate with the fire unit 130 through serial and/or parallel communication using building automation protocols over a Modbus network. In some cases, the I/O interface 122 may communicate with the access control unit 132 through serial and/or parallel communication using building automation protocols over an EnOcean network. In some cases, the I/O interface 122 may communicate with the lighting unit 134 through serial and/or parallel communication using building automation protocols over a DALI network. These are just examples of building control network protocols that may be used to facilitate communication between the local computing device 102 and the building control components of various building control units 148. Other building control network protocols that are contemplated include, but are not limited to, 1-Wire, C-Bus, CC-Link Industrial Networks, DSI, Dynet, KNX, LonTalk, oBIX, VSCP, xAP, X10, Z-Wave, ZigBee, INSTEON, TCIP, and/or Ethernet.

In some cases, the computing device 102 and the computer system 152, when both are provided, may utilize a network 150 to communicate. In some examples, the network 150 may be a local area network (LAN), a general wide area network (WAN), and/or a public network (e.g., the Internet). Furthermore, in some cases, the network 150 may include copper transmission cables, optical transmission fibers, wireless transmission, routers, firewalls, switches, gateway computers and/or edge servers. In some instances, a network adapter 124 is included in the computing device 102 and a network adapter 170 is included in the computer system 152 to support communication. In some cases, the building control unit block 148 may include the computer system 152. In other cases, there may be multiple computer systems 152 that can access the network 150 and communicate with the computing device 102 or directly to the building control units 148.

In some cases, the computer system 152 is of a type that is suitable for accessing and/or utilizing the points manager 120, consistent with examples of the present disclosure. The computer system 152 provides only an illustration of one implementation and does not imply any limitations with regard to the environments in which different examples may be implemented. Many modifications to the computer system 152 may be made based on design and implementation requirements. Examples of computer systems, environments, and/or configurations that may be represented by the computer system 152 include, but are not limited to, desktop computers, laptop computers, tablet computers, server computers, thin clients, thick clients, multiprocessor systems, microprocessor-based systems, and distributed cloud computing environments. In some cases, computer system 152 merely provides a user interface for a building operations technician or the like to interact with the points manager 120 of the computing device 102. In some cases, the user interface function of the computer system 152 may be implemented by computing device 102, and the computer system 152 may not be needed.

In some cases, components of the computer system 152 may include a computer 172 and a user interface 188. Components of the computer 172 may include a processor 180, a memory 182, an I/O interface 184, and the network adapter 170. Each of the components of the computer 172 may be connected to an internal bus 186 that includes data, address, and control buses, to allow the components of the computer 172 to communicate with each other via the bus 186.

In some cases, the processor 180 may be a central processing unit (CPU) that executes an operating system and computer software executing under the operating system. In some cases, the memory 182 may be configured and operate similar to the system memory 106. For instance, the memory 182 may include computer system readable media in the form of volatile memory, such as random access memory (RAM) and/or cache memory. In addition, the memory 182 may also include a storage device configured to read from and write to a non-removable, non-volatile magnetic media. In some cases, the processor 180 may execute instructions stored in the memory 182.

In some cases, the computer 172 may communicate with one or more external devices such as the user interface 188. In some cases, the user interface 188 may include a keyboard 174, a mouse 176, and a display 178, which enable a user to interact with the computer system 152 via I/O interface 184. The computer system 152 may communicate with other computer devices (e.g. computing device 102) through one or more networks (e.g., network 150).

To help provide a more intuitive building energy management system 100, in some cases, the computer system 152 may allow users to request points lists of the building control units 148. In some cases, the points lists may provide information about the building control units, presented in an organized fashion that gives users a more transparent, detailed, and/or valuable assessment of the operation of the building control units. For example, the computer system 152 may send a request for a points list of the HVAC unit 126 to the computing device 102 over the network 150. In some cases, the request may include a selection of only certain HVAC equipment of the HVAC unit 126 and/or only certain points of the HVAC unit 126 to be included in the points list. For example, the computing device 102 may be programmed with a points manager 120 that provides the controller 104 instructions to access a schematic representation of the HVAC unit 126 (e.g., access the schematic representation of the HVAC unit from the memory 106) bounded with points according to the binding information application 154. In some cases, the HVAC unit 126 may be newly installed or a component of the HVAC unit 126 may be newly installed. As such, initially the controller 104 may request information from the HVAC unit 126 (e.g., from a building control component of the HVAC unit 126) regarding the newly installed unit 126 or component. The binding information application 154 may then provide instructions for binding points to the newly installed unit 126 or component based on the information obtained from the HVAC unit 126. The points manager 120 may then provide instructions to the controller 104 for producing a new or updated schematic representation of the HVAC unit 126 with the bounded points and store it in the memory 106. In some cases, the points manager 120 may provide instructions to the controller 104 to extract the points requested for the HVAC unit and generate a points list in a list format. The controller 104 may then communicate with the user interface 188 over the network 150 and display the generated points list on the display 178.

In some cases, when the generated points list is displayed on the display 178, a user may further refine and configure the points list. For example, in some cases, the user may use the keyboard 174, the mouse 176, and/or the display 178 to select particular points from the points lists and save the particular points under a subcategory points list. For instance, the subcategory points list may be designated as a favorite set of points. Additionally, a user defined link to the favorite set of points may be created such that when the user defined link is selected by the user via the computer system 152, only the points associated with the favorite set of points may be displayed on the display 178. In some cases, when the user configured points list is saved, the controller may be configured to store the user configured points list including the favorite set of points in the memory 106. In some cases, the user configured points list may also be saved in the memory 182 of the computer 172.

As stated above, the points lists may provide information about the building control devices in an organized manner. For example, the points lists may include a plurality of columns such as, a point name column, an alarm column, a point value column (e.g., a set point value, a sensor value, etc.), a point operational status column, a point storage location pathway column, etc., an example of which is shown in FIG. 3C. In some cases, the points lists may also provide filter tools to allow a points list to be generated that may include only the points that meet the filter requirements. For instance, each point in the points list may have an alarm column that indicates the alarm status of the point. When an alarm filter is selected, a points list may be generated and displayed on the display 178 that includes only those points that are currently under an alarm condition.

Figure 2:
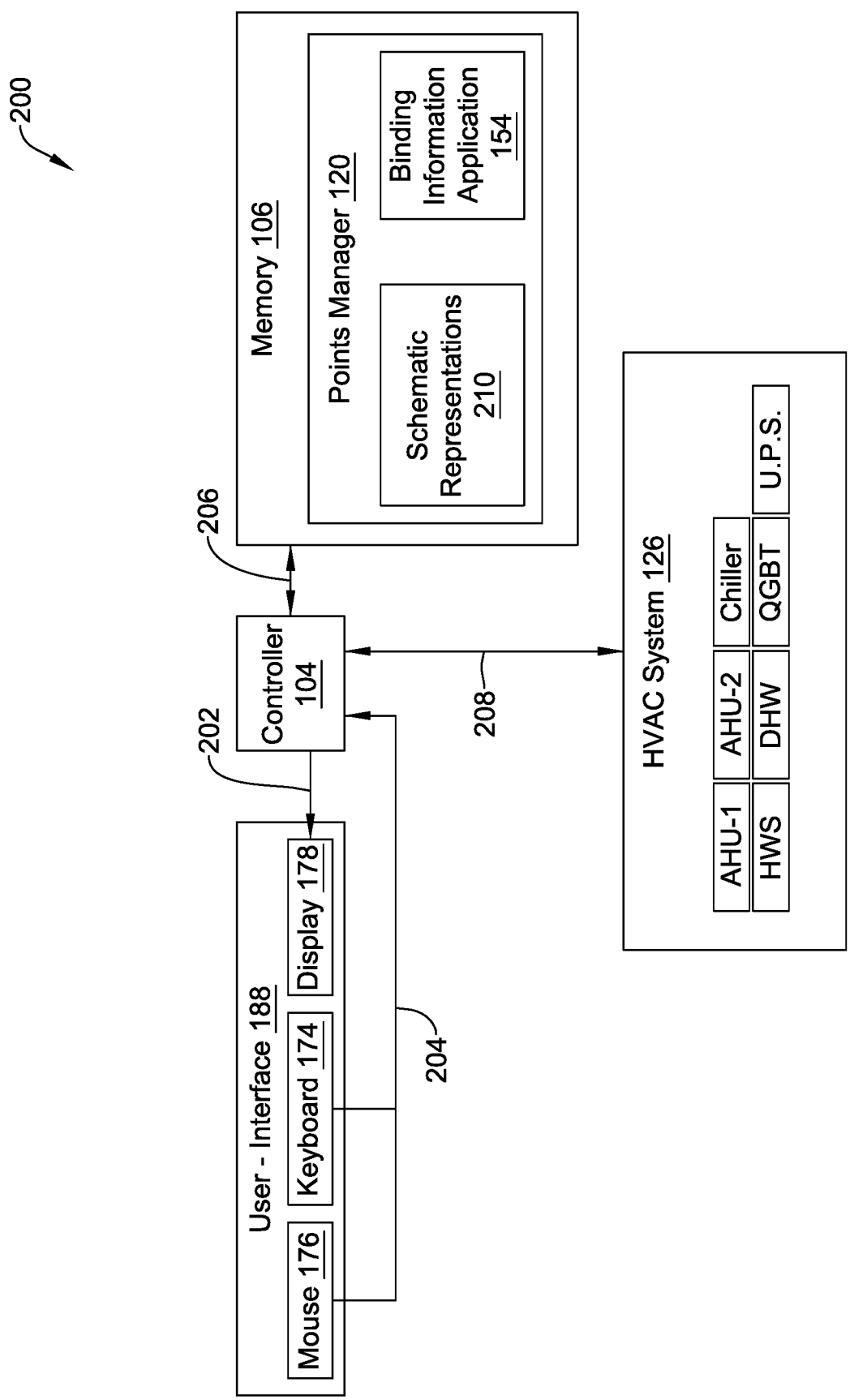
FIG. 2 is a simplified schematic block diagram of an illustrative building management system.
Figure 3A:
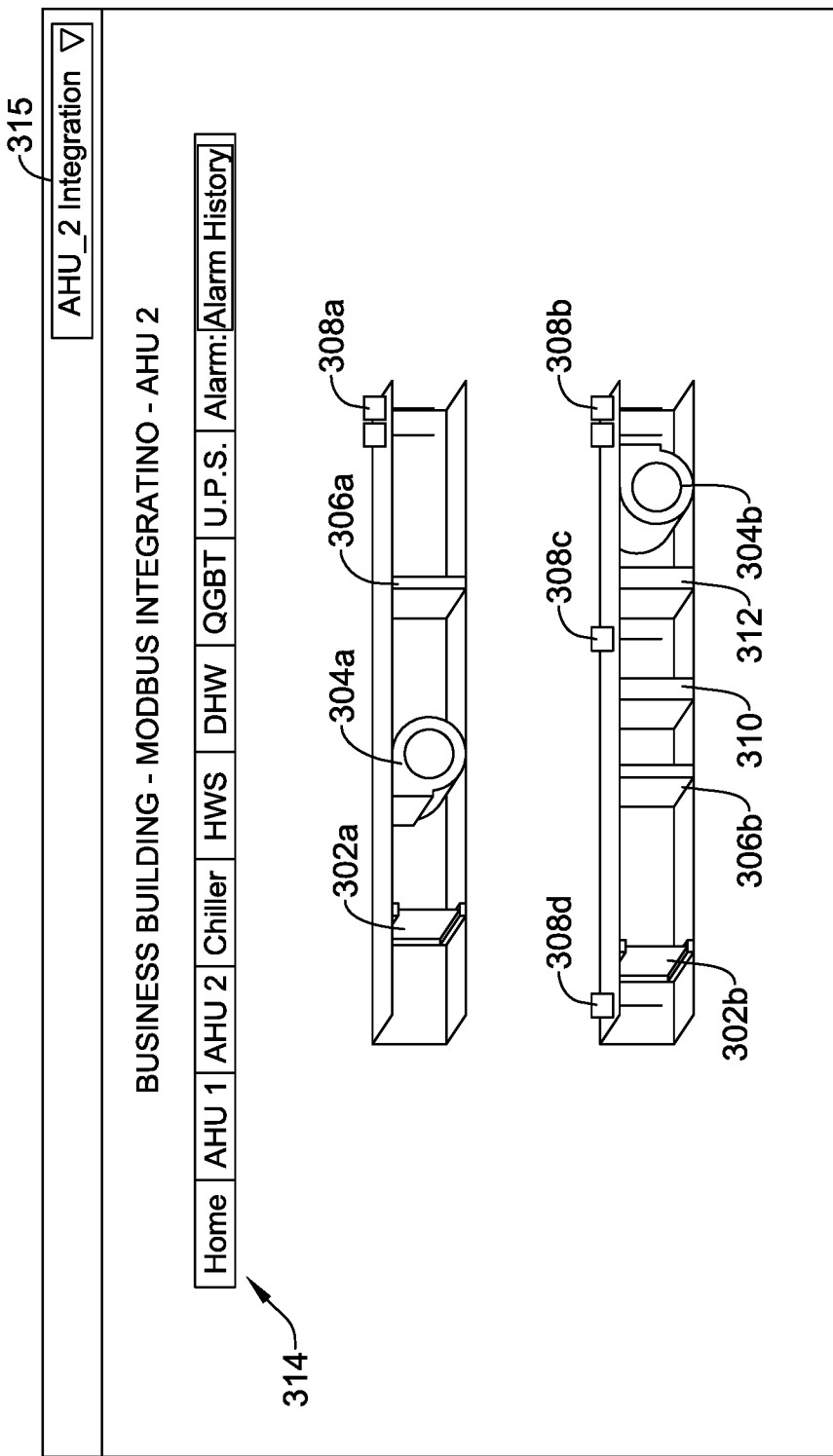
FIG. 3A is an illustrative schematic representation screen for a building control device of the illustrative building management systems of FIG. 1 or 2.

FIG. 2 is a simplified schematic block diagram of an illustrative building management system 200. FIG. 2 will be described in conjunction with FIGS. 3A-3C, FIGS. 4A-4C, FIGS. 5A-5C, and FIG. 6. The diagram 200 depicts the generating and configuring of points lists for building control units. In some cases, the controller 104 generates a schematic representation of a building control unit 148 component on the display 178 of the user-interface 188, as shown at 202. FIG. 3A depicts an example of such a schematic representation 300 of an air handling unit (AHU) 2. In some cases, the controller 104 may access the schematic representation 300 of the AHU 2 from a schematic representations module 210 of the points manager 120 stored in the memory 106. In some instances, the controller 104 may execute code such as HTML, CSS, JavaScript (including JSON), SQL, PHP, XML, etc., to display the schematic representation 300 of the AHU 2 in a browser application. As shown in FIG. 3A, the AHU 2 schematic representation 300 may include a plurality of points bounded to the AHU 2 in accordance with binding information provided by the binding information application 154. In some cases, the binding information may be used to bind the points to the AHU 2 and other building control units 148 when the schematic representations are created and updated. As shown in FIG. 3A, the plurality of points may related to dampers 302A-302B (e.g., exhaust dampers, intake dampers, etc.), fans 304A-304B (e.g., extract fans, supply fans, etc.), filters 306A-306B, environmental sensors 308A-308D (e.g., thermostats, humidity sensors, air flow sensors, etc.), cooling unit 310, and heating unit 312. In some cases, the AHU 2 schematic representation 300 may include fewer or additional points, depending on the particular equipment installed. In some instances, the AHU 2 schematic representation 300 may give a brief overview of the operation and location of the points of the AHU 2 (e.g., operational values or set points, environmental conditions, component status, etc.).

In some cases, the AHU 2 schematic representation 300 may also include a navigational bar 314 that includes, for example, a home tab, an AHU 1 tab, an AHU 2 tab, a chiller tab, an HWS tab, a DHW tab, a QGBT tab, a U.P.S. tab, and an alarm tab. In some examples, the navigational bar 314 may include more or fewer tabs, depending on the equipment installed in the building. In some instances, the schematic representations may not include the navigational bar 314 and there may be another mechanism for navigating to and from schematic representations of different building control units. In some cases, when the tabs of the navigational bar 314 are selected 204 (e.g. via the user interface 188 of FIG. 2), the controller 104 may generate and display a schematic representation of the selected building control unit 148 component or a home screen on the display 178, as shown at 202. In some cases, the alarm tab may include a designation number and an alarm history button, for example. When the alarm history button is selected 204, the controller 104 may generate a page detailing the alarm history and status of one or more alarms of the AHU 2. The AHU 2 schematic representation 300 may also include a component integration drop down menu, such as an AHU 2 integration drop down menu 315. FIG. 3A depicts the AHU 2 integration drop down menu 315 in a collapsed state. When the AHU 2 integration drop down menu 315 is selected the controller 104 may generate the AHU 2 integration drop down menu 315 in an expanded state, an example of which is depicted in FIG. 3B.

Figure 3B:
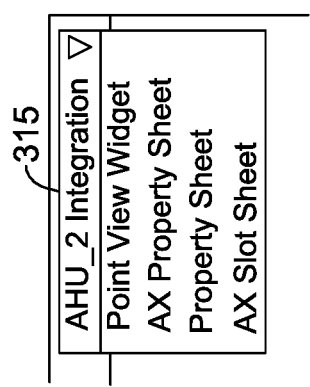
FIG. 3B is an illustrative drop down menu available for selection by a user via the schematic representation screen of FIG. 3B, including an illustrative Point View Widget selection.

As shown in FIG. 3B, the AHU 2 integration drop down menu 315 may include a plurality of menu options that can be selected as shown at 204 to send a request to generate a particular view of the AHU 2. In this example, the plurality of options may include a point view widget option to create a points list, an AX property sheet option to create AX property sheets, a property sheet option to create property sheets, and an AX slot sheet option to create AX slot sheets. In some examples, the AHU 2 integration drop down menu 315 may include less or more options to create particular views from the AHU 2 schematic representation 300. In some cases, when the point view option is selected, the controller 104 may receive the request for a points list for the AHU 2 and automatically extract 206 and generate 202 the requested points list on the display 178.

FIG. 3C depicts an example generated points list 316 that is generated after selecting the point view widget option from the AHU 2 integration drop down menu 315 of FIG. 3B. In some cases, as shown, the generated points list 316 may be in a list format and may include some or all of the points from the AHU 2 schematic representation shown in FIG. 3A. In some cases, the points list 316 may include a search toolbar 360 to search for a particular point by name. In some cases, certain points that a user only wants to see on the points list 316 may be selected or specified from the schematic representation. As such, the points list 316 may include less or more points than indicated in the schematic representation. In further examples, the points list 316 may have a default view 318 where, for example, all or a default subset of the points of the AHU 2 are shown in the points list 316. In some cases, the points list 316 may have a plurality of columns 320 that include, for example, a point name column 322, a point operational value column (e.g., a set point value) 324, a point log/history column 326, a point status column 328, a point storage location pathway column 330, and/or any other suitable column. In some cases, the points list 316 may also include a point alarm column that indicates whether a corresponding point is currently under an alarm condition. In some cases, the alarm conditions may be displayed in the point status column 328.

Figure 4B:
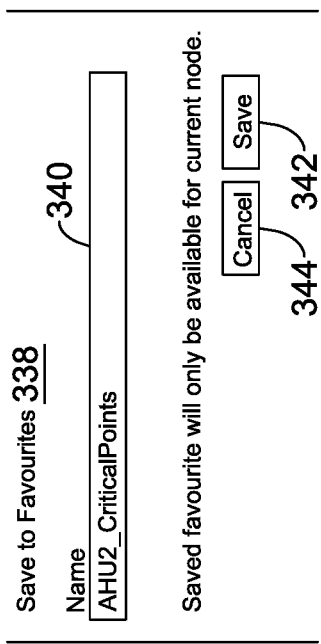
FIG. 4B is an illustrative save to favorites screen that may be displayed after a Save to Favorites selection is made from the points list screen of FIG. 4A.

In some cases, the points list 316 may include selection options 334A-334L that can be selected by the user. Certain actions may then be applied to the selected points. For example, turning to FIG. 4A, the selection options 334A-334D have been selected by the user. The illustrative points list 316 includes a drop down menu 336, which is shown in an expanded state and includes a plurality of actions. In the example shown, the plurality of actions may include a set to manual action, a set to auto action, an export to CSV action, and a save to favorites action. In other cases, the plurality of actions may include less or more actions. Continuing with the example, the save to favorites action may be selected and in response, the controller 104 may generate a "Save to Favorites" menu 338, as depicted in FIG. 4B. As shown in FIG. 4B, the Save to Favorites menu 338 may include a toolbar 340 that allows the user to designated a name for the selected set of points (e.g., AHU2_CriticalPoints). The illustrative Save to Favorites menu 338 also includes a save button 342 for confirming that the user wants to save the selected points as a favorite set of points, and a cancel button 344 to cancel the favorites operation. When a name is given to the selected points in the toolbar 340 and the save button 342 is selected, the controller 104 may create a favorites link to the selected points. In some cases, the favorites link may be identifiable by the name given by the user to the selected points (e.g., AHU2_CriticalPoints). The controller 104 may also store the link between the selected points and the favorite set points link in the memory 106.

In some cases, the points list 316 may also include a drop down menu to select the previously saved and named favorite link. For example, FIG. 4C depicts a drop down menu 346 in an expanded state, and includes a plurality of views of points list for the AHU 2. As described above, FIG. 3C shows the default view 318 of the points list 316. In this case, the default view 318 shows all the points of the AHU 2. However, the drop down menu 346 may include other views such as a graphical view and one or more favorites views. In some cases, the graphical view may include a link 348 for the graphic view of the AHU 2 such as shown in FIG. 3A. In some instances, when the link 348 is selected, the controller 104 may regenerate the AHU 2 schematic representation 300 on the display 178. With the favorite set points link established, the favorite points link 350 may be included in the favorites view. As shown, the favorite points link 350 is identifiable by the name given to the selected points in the toolbar 340 (i.e., AHU2_CriticalPoints). When the favorite points link 350 is selected via menu 346, the controller may extract and generate a points list that only includes the favorite set of points.

In some cases, the steps described above may be repeated to generate multiple different favorite points lists. For instance, referring back to FIG. 3C, a user may select selection options 334E-334H, give a name to the newly selected points (e.g., AHU2_CriticalPoints2), and select the save button 342. In response, the controller 104 may link the newly selected points to a second favorite points link (i.e., AHU2_CriticalPoints2) and store the second link in the memory 106. Upon subsequent selection of the drop down menu 346, the favorites view may now be populated with the link 350 and the second link for the second favorite points list.

Figure 5B:
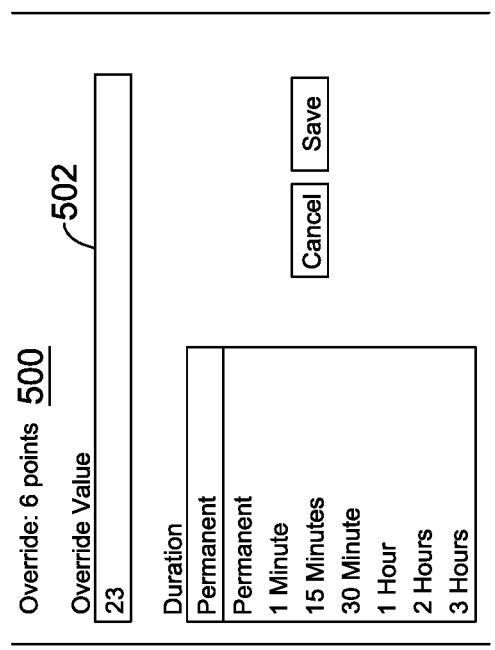
FIG. 5B is an illustrative override screen that may be displayed after a Set to Manual selection is made from the points list screen of FIG. 5A.
Figure 6:
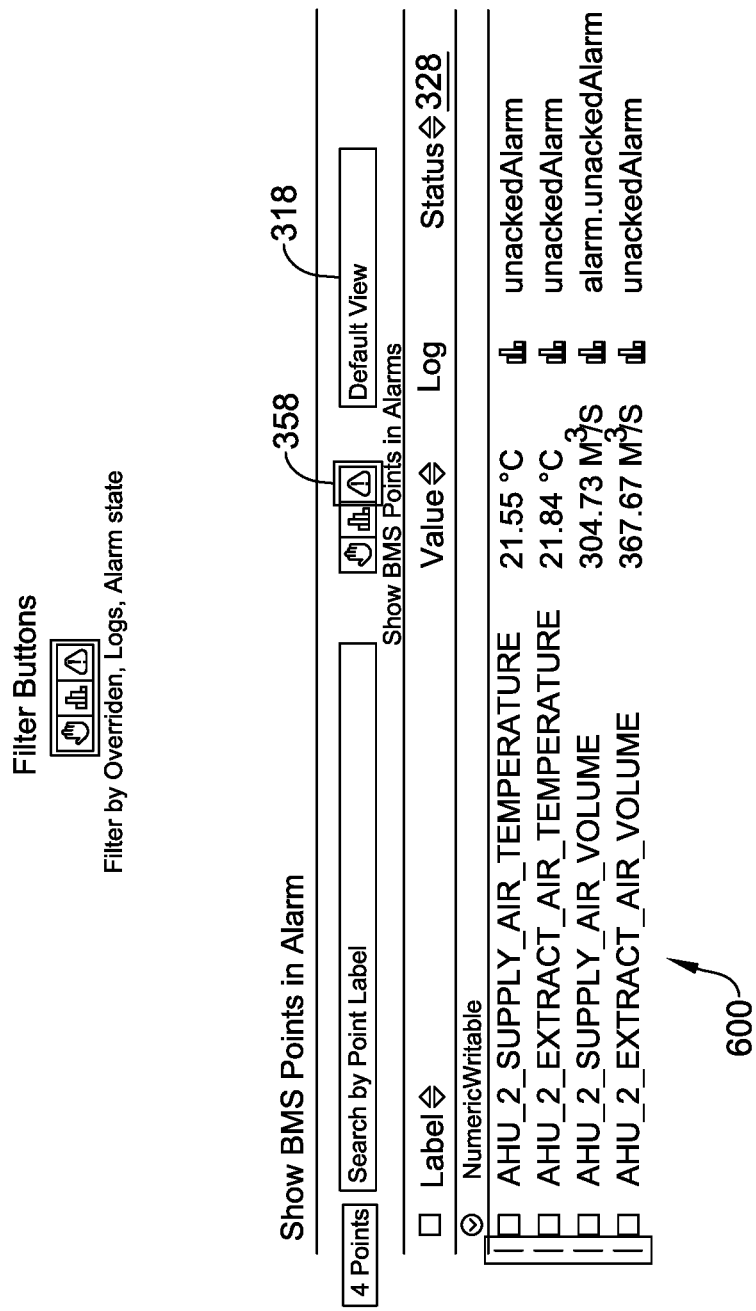
FIG. 6 is another illustrative points list screen that includes a number of filter buttons including an alarm filter button.

Turning to FIG. 5A, in another example, the selection options 334A-334F have been selected 204 and the drop down menu 336 has been selected into its expanded state. In this example, the "Set to Manual" action has been selected and in response, the controller 104 may generate an override page 500, as depicted in FIG. 5B, for the six selected points. As shown in FIG. 5B, the override page 500 may include a toolbar 502 for setting an override value for the selected points, a duration drop down menu for setting a durational time for the selected points to be set at the override value (e.g., permanent, 1 minute, 15 minutes, 30 minutes, 1 hour, 2 hours, 3 hours, etc.), a save button 504 for confirming that the user wants to save the override value for the selected points, and a cancel button 506 to quit the set to manual action. When a value is set for the selected points (i.e., 23, in this example), the durational time is set, and the save button 504 is selected 204, the controller may update (from FIG. 2) the values at which the selected points of the AHU 2 operate in the field. Additionally, as shown in FIG. 5C, the controller 104 may regenerate the points list 316 with the override value (i.e., 23 shown in the value column 324) for the selected points.

Referring back to FIG. 3C, the points list 316 may include a number of point list filters 352. In some cases, the points list filters 352 may include an override filter 354, a logs filter 356, and an alarm filter 358. In some cases, the filters 352 may include less or more filters. In some instances, the filters 334 may be used to generate and display a points list that only includes the points that meet the filter requirements. For example, turning to FIG. 6, the alarm filter 358 has been selected. Accordingly, the controller 104 may extract a points list 600 from the points list 316 such that only the points that are currently under an alarm condition may be generated 202 and displayed on the display 178. Moreover, upon selection of a point under the alarm condition, the controller 104 may acknowledge the alarm condition and generate the points list 600 having an updated status (shown in point status column 328) for the selected point. In some cases, multiple points under alarm conditions may be selected 204 and the controller may batch acknowledge the alarm conditions and generate the point list 600 having a batch updated status for the selected points.

In some cases, a building control unit (e.g., the building control units 148 from FIG. 1) or a component of the building control unit may be newly installed. In this example, turning to FIG. 2, the controller 104 may request and obtain 208 information from the HVAC unit 126 (e.g., from a building control component of the HVAC unit 126) regarding the newly installed unit 126 or component. The controller 104 may then obtain 206 binding information from the binding information application 154 that binds points to the newly installed unit or component based on the information obtained from the HVAC unit 126. The points manager 120 may then provide instructions to the controller 104 for producing a new or updated schematic representation of the HVAC unit 126 with the bounded points and store the schematic representation with the schematic representations in the memory 106. In some cases, the controller 104 may then extract and generate a points list for the newly installed unit or component on the display 178 from the schematic representation.

Figure 7:
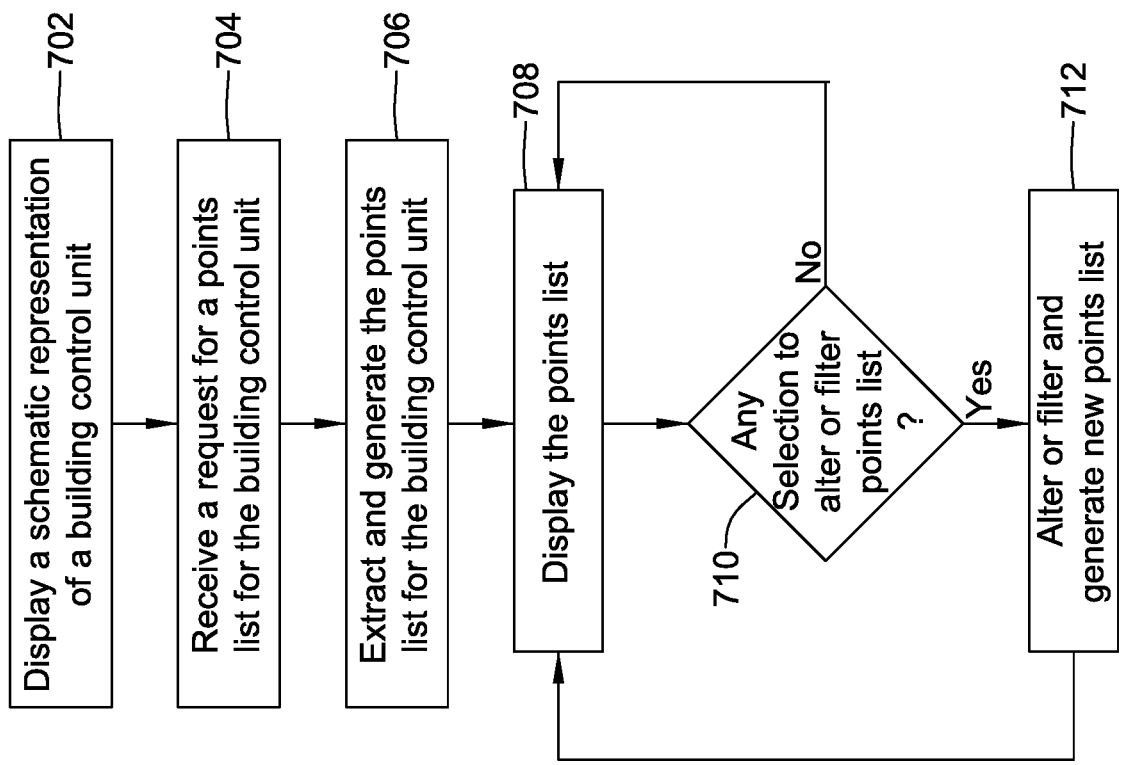
FIG. 7 is a flow diagram showing an illustrative method.

FIG. 7 depicts an illustrative method 700 for generating a points list for a building control unit. The method 700 begins at step 702, where a schematic representation of the building control unit is displayed. In some examples, the schematic representation may display points bounded to the building control unit in accordance with binding information. At step 704, a request for a points list for the building control unit may be received. At step 706, a points list for the building control unit may be extracted and generated. In some examples, the points list may be in a list format and may include some or all of the points from the schematic representation. In some examples, the points list may include more points than the schematic representation. At step 708, the points list may be displayed. Step 710 determines if there are selections to either alter the points list or filter the points list. If there are no selections to alter or filter the points list, the points list may continue to be displayed at step 708. However, when there is a selection to alter or filter the points list, such as selection of a favorites point list, only the designated points are displayed.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description as examples or embodiments, with each claim standing on its own as a separate embodiment, and it is contemplated that such embodiments can be combined with each other in various combinations or permutations.

What is claimed is:

1. A building energy management system for controlling one or more building control units, where each building control unit includes a number of points, the building energy management system comprising:
   a user interface including a display;
   a memory for storing binding information used in binding each of the points of the one or more building control units to the building energy management system;
   a controller operatively coupled to the user interface, the memory, and the one or more building control units, the controller is configured to:
      display a schematic representation of at least one of the building control units on the display, the schematic representation of the at least one building control unit including two or more points that are bound to the at least one building control unit in accordance with the binding information stored in the memory;
      receive via the user interface a request from a user requesting to generate a points list for at least some of the points that are bound to the at least one building control unit displayed in the schematic representation on the display;
      in response to receiving the request from the user, automatically extract and generate a points list in a list format that includes at least some of the points that are bound to the displayed building control unit, wherein the generated points list includes a plurality of columns, including a point name column and one or more of a point value column, a point status column and a point log column;
      display the generated points list on the display; and
      allow a user to select one or more first points from the displayed points list and to link those selected first points to a first favorite set of points link, wherein when the user subsequently selects the first favorite set of points link, the controller is configured to display only those points that were linked to the first favorite set of points link in a points list.

2. The building energy management system of claim 1, wherein the generated points list includes an alarm column, wherein the alarm column indicates if the corresponding point is currently under an alarm condition.

3. The building energy management system of claim 2, wherein the generated points list includes an alarm filter option, that when selected, removes all points from the displayed points list except those under an alarm condition.

4. The building energy management system of claim 2, wherein the controller is configured to allow a user to select two or more points from the displayed points list that are under an alarm condition and batch acknowledge the alarm conditions.

5. The building energy management system of claim 1, wherein the controller is configured to allow a user to select two or more points from the displayed points list and to batch set the selected two or more points to a manually input value.

6. The building energy management system of claim 1, wherein the one or more building control units comprises an HVAC unit.

7. The building energy management system of claim 6, wherein the one or more building control units comprises an air handling unit (AHU).

8. The building energy management system of claim 1, wherein the controller is configured to execute html code to display in a browser application program the schematic representation of at least one of the building control units and the generated points list.

9. The building energy management system of claim 1, wherein the request from the user requesting to generated the points list for at least some of the points that are bound to the at least one building control unit is received via a selection of a point view menu option in a drop-down menu.

10. The building energy management system of claim 1, wherein the controller is further configured to:
 allow a user to select one or more second points from the displayed points list and to link those selected second points to a second favorite set of points link, wherein when the user subsequently selects the second favorite set of points link, the controller displays only those points that were linked to the second favorite set of points link.

11. The building energy management system of claim 10, wherein the first favorite set of points link and the second favorite set of points link are added to and selectable from a menu accessible via the user interface, wherein the user subsequently selects the first favorite set of points link or the second favorite set of points link from the menu.

12. The building energy management system of claim 2, wherein the controller is further configured to:
 allow a user to select a filter via the user interface that removes all points from the displayed points list except for those that are under an alarm condition.

13. The building energy management system of claim 12, wherein the controller is configured to allow a user to select two or more points from the displayed points list that are under an alarm condition and batch acknowledge the alarm conditions.

* * * * *